Nov. 17, 1959   A. J. GREEN   2,912,870
VALVE OPERATING MECHANISM
Filed Dec. 16, 1957

INVENTOR.
ARTHUR J. GREEN
BY
Whittemore, Hulbert & Belknap
ATTORNEYS

United States Patent Office 2,912,870
Patented Nov. 17, 1959

2,912,870

VALVE OPERATING MECHANISM

Arthur J. Green, Bedford, Ind., assignor to The Roberts Brass Manufacturing Co., Mitchell, Ind., a corporation of Michigan Application December 16, 1957, Serial No. 702,902

3 Claims. (Cl. 74—109)

This invention relates generally to valves, and refers more particularly to the operating mechanism for gas valves of the rotary plug type, such as those used for controlling the supply of gas to gas burners.

One of the essential objects of the invention is to provide an operating mechanism wherein an actuating member for the rotary plug of the valve travels through a rectilinear path, instead of moving annularly or angularly, as heretofore.

Another object is to provide an operating mechanism wherein movement of the rectilinearly movable actuating member will provide rotary movement of the rotary plug of the valve.

Another object is to provide an operating mechanism wherein the actuating means for the rotary plug of the valve includes a gear and rack bar assembly capable of being operated with ease for regulating the flow of gas through the valve to the gas burner.

Another object is to provide an operating mechanism that may be utilized with a gas valve for controlling the flow of gas to various gas appliances such as gas furnaces, gas fired room heaters, gas incinerators, gas clothes dryers, etc.

Another object is to provide an operating mechanism that is simple in construction, economical to manufacture, and efficient in use.

Other objects, advantages and novel details of construction of this invention will be made more apparent as this description proceeds, especially when considered in connection with the accompanying drawing wherein.

Figure 2:
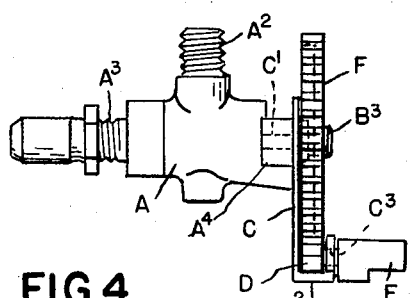
Fig. 2 is a side elevational view of the structure shown in Fig. 1.
Figure 1:
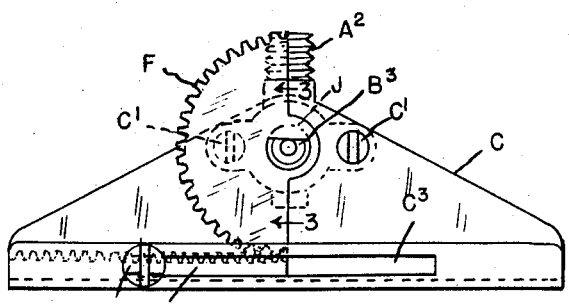
Fig. 1 is a front elevational view of a valve provided with our improved operating mechanism.
Figure 4:
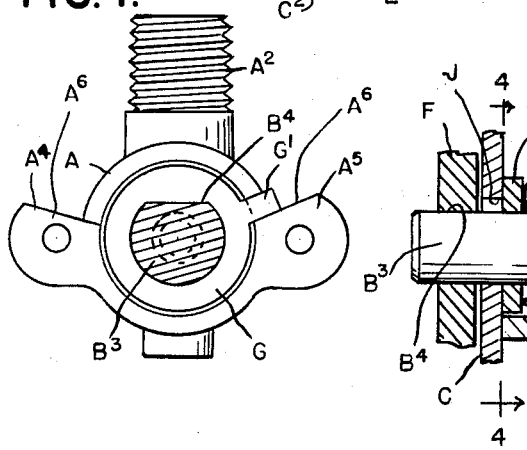
Fig. 4 is a vertical sectional view taken substantially on line 4—4 of Fig. 3.
Figure 3:
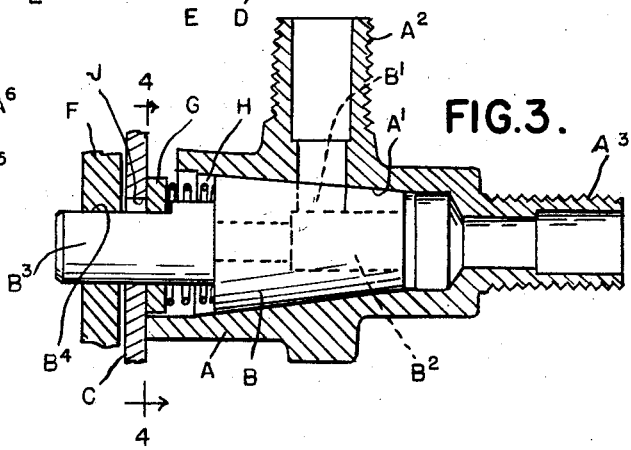
Fig. 3 is a fragmentary sectional view, partly in elevation, and taken substantially on line 3—3 of Fig. 1.
Figure 5:
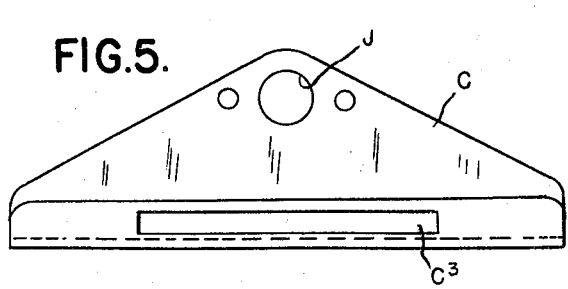
Fig. 5 is a detail front elevational view of the frame member.
Figure 6:
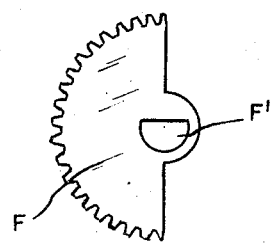
Fig. 6 is a detail front elevational view of the gear segment.
Figure 7:
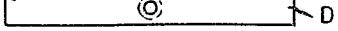
Fig. 7 is a detail front elevational view of the rack bar.

As illustrated, A is the body of a valve of the rotary plug type and having a conical recess $A^1$ receiving and forming a seat for a correspondingly shaped rotary plug B. $A^2$ and $A^3$ are threaded nipples respectively extending radially and axially from the body A to form gas inlet and outlet connections for gas passages $B^1$ and $B^2$ in said rotary plug B. Preferably opposite sides of the body A are provided with ears $A^4$ and $A^5$ that extend laterally therefrom at the forward end thereof.

C is a frame member formed of sheet metal and secured by screws $C^1$ to the ears $A^4$ and $A^5$ at the outer sides thereof. Preferably this frame member C has a first upright flat plate portion that extends transversely of the body A and laterally beyond opposite sides thereof, and also extends downward therefrom. The frame member also has a second flat upright plate portion overlying the first plate portion in spaced parallel relation thereto and at the side thereof away from the body A. This second plate portion is in the nature of a flange, and a flat horizontal base portion extends between and connects the first and second plate portions at the lower edges thereof to provide an elongated, upwardly opening straight channel $C^2$. The upstanding second plate portion or front flange of the channel $C^2$ has formed therein a longitudinally extending slot $C^3$.

D is a rack bar within and slidable lengthwise of the channel $C^2$, and E is a forwardly projecting operating handle extending through the slot $C^3$ and connected to said rack bar D. F is a gear segment upon the outer side of the frame member C and intermeshing with the rack bar D.

For attaching the gear segment F to the plug B, the latter is provided with an axially extending operating stem $B^3$ having a flattened face $B^4$ on one side thereof. The gear segment F has in the hub portion thereof an aperture $F^1$ provided with a correspondingly flattened face, so that the gear segment F may be non-rotatively sleeved upon the stem $B^3$.

Thus, from the foregoing, it will be apparent that movement of the handle E in the slot $C^3$ from one end to the other thereof will cause the rack bar D to travel lengthwise of the channel $C^2$ and rotate the gear segment F. Also, it will be apparent that the rack bar D is held against accidental displacement from the channel $C^2$ by the operating handle E extending through the guideway $C^3$ in the front flange of said channel.

A stop washer G is also non-rotatively sleeved upon the stem $B^3$ and has a radially projecting lug $G^1$ for alternately engaging upwardly and outwardly inclined edges $A^6$ of the ears $A^4$ and $A^5$. This will exactly limit the amount of rotary movement of the plug B.

A helical spring H is sleeved about the stem $B^3$ between the stop washer G and the plug B for yieldably pressing the latter against its seat $A^1$ within the body A. The frame member C has a round or circular opening J in which the stem $B^3$ is free to rotate.

With the construction as above described, the valve plug B may be adjusted by the rectilinear movement of the handle E lengthwise of the guide slot $C^3$. Such movement will be translated through the rack bar D and gear segment F to impart a rotary movement to the stem $B^3$ and plug B, so that the latter may be turned from fully closed to fully open position, as desired.

What I claim as my invention is:

1. Actuating means for a valve having a rotary plug, said actuating means comprising a body having an upright transverse end, a rotary actuating stem projecting from said end of said body, a frame member having an upright first flat plate portion in surface-to-surface contacting relation with said end of said body and extending transversely of said body and laterally beyond opposite sides thereof, said first plate portion being secured to said body and extending downwardly therefrom, said frame member having a second flat upright plate portion overlying said first plate portion in spaced parallel relation thereto and at the side thereof away from said body, and a flat horizontal base portion extending between and connected to the first ad second plate portions at the lower edges thereof to provide an elongated, upwardly opening, straight channel, said second plate portion having an elongated closed slot therein extending longitudinally of said channel to provide an elongated guideway, an elongated rack bar within and slidable lengthwise of said channel and having rack teeth on the upper side, an operating handle having a portion exteriorly of said channel and having another portion extending through and slidable lengthwise of said guideway and secured to said rack bar at the midpoint of its length, and means for converting the sliding movement of said operating handle into rotary movement of said actuating stem including a gear segment on the side of said first plate portion opposite said body, said gear segment being parallel to said first plate portion and above said rack bar in mesh therewith, and said gear segment being non-rotatively sleeved upon said actuating stem, said handle cooperating with said second plate portion of said channel to prevent accidental removal of said rack bar from said channel and said channel being of sufficient depth to fully receive said rack bar including the teeth thereon so that the meshing engagement of said rack and gear segment is shielded by the portions of said frame member defining said channel.

2. Actuating means as in claim 1 including means for limiting the sliding movement of said rack bar in both directions so that said rack bar, in its limiting positions and in all intermediate positions, is fully received in said channel and does not project beyond either end thereof.

3. Actuating means as in claim 2 in which said body is provided at opposite sides thereof with laterally projecting ears having aligned upright surfaces defining said upright transverse end of said body, and said means for limiting the sliding movement of said rack bar includes upwardly and outwardly inclined edges of said ears above said aligned upright surfaces thereof, said inclined edges serving as limit stops, and means providing a lug on said stem alternately engageable with said limit stops.

References Cited in the file of this patent

UNITED STATES PATENTS

| | | |
|---|---|---|
| 542,870 | Cook | July 16, 1895 |
| 768,138 | Northrup | Aug. 23, 1904 |
| 1,392,449 | Richards | Oct. 4, 1921 |
| 2,412,320 | Fischer | June 20, 1950 |
| 2,723,102 | Mueller | Nov. 8, 1955 |